United States Patent
Shimizu et al.

(10) Patent No.: US 8,191,370 B2
(45) Date of Patent: Jun. 5, 2012

(54) ENGINE WITH SUPERCHARGER

(75) Inventors: Kouji Shimizu, Osaka (JP); Takashi Miyamoto, Osaka (JP); Takao Kawabe, Osaka (JP); Tetsuo Sakaki, Kawasaki (JP); Isamu Kawashima, Kawasaki (JP); Toshiro Itatsu, Toyota (JP)

(73) Assignee: Yanmar Co., Ltd., Osaka (JP)

( * ) Notice: Subject to any disclaimer, the term of this patent is extended or adjusted under 35 U.S.C. 154(b) by 630 days.

(21) Appl. No.: 12/304,090

(22) PCT Filed: Apr. 19, 2007

(86) PCT No.: PCT/JP2007/058542
§ 371 (c)(1),
(2), (4) Date: Apr. 9, 2009

(87) PCT Pub. No.: WO2007/145021
PCT Pub. Date: Dec. 21, 2007

(65) Prior Publication Data
US 2010/0236531 A1    Sep. 23, 2010

(30) Foreign Application Priority Data
Jun. 12, 2006 (JP) .................................. 2006-162393

(51) Int. Cl.
*F02B 33/00* (2006.01)
(52) U.S. Cl. ............. 60/607; 60/608; 123/564; 123/445
(58) Field of Classification Search .................. 123/445, 123/564; 60/608, 607, 609, 602
See application file for complete search history.

(56) References Cited

U.S. PATENT DOCUMENTS

| 4,309,871 A | 1/1982 | Venema |
| 2002/0062646 A1 | 5/2002 | Dellora et al. |
| 2004/0216457 A1* | 11/2004 | Shea et al. ................. 60/608 |
| 2005/0218889 A1* | 10/2005 | Yamada et al. .......... 324/207.25 |

FOREIGN PATENT DOCUMENTS

| JP | 63-248920 | 10/1988 |
| JP | 63-182245 | 11/1988 |
| JP | 04-041960 | 2/1992 |
| JP | 2003-021002 | 1/2003 |
| JP | 2003-240788 | 8/2003 |
| JP | 2005-155497 | 6/2005 |
| JP | 2005-220863 | 8/2005 |
| JP | 2005-299618 | 10/2005 |

OTHER PUBLICATIONS

International Search Report for PCT/JP2007/058542, the Japanese Patent Office, mailed Jul. 24, 2007, 3 pgs.
Supplementary European Search Report and European Search Opinion for corresponding EP Application No. 07 74 1978, European Patent Office, mailed Jun. 7, 2010, 8 pgs.

* cited by examiner

*Primary Examiner* — Quyen Leung
*Assistant Examiner* — Leda Pham
(74) *Attorney, Agent, or Firm* — Sterne, Kessler, Goldstein & Fox P.L.L.C.

(57) ABSTRACT

In an engine equipped with a supercharger consisting of a compressor having a plurality of blades on a turbine shaft and a turbine, at least one index means provided on the turbine shaft or the plurality of blades, and a turbo angular velocity sensor, which detects a rotation of the index means and a rotation of the plurality of blades respectively and connected to an ECU. In the engine, also, a turbo angular velocity computing means, which calculates an angular velocity by obtaining a plurality of pulses per one rotation of the turbine shaft, is provided.

3 Claims, 17 Drawing Sheets

ENGINE WITH SUPERCHARGER

BACKGROUND OF THE INVENTION

1. Field of the Invention

The present invention relates to a technique for detecting an angular rate change of a supercharger and controlling an engine so as to prevent the supercharger from entering into a surging area in an electronically-controlled injected engine equipped with the supercharger.

2. Related Art

In an engine, as a mass of air inhaled therein is increased, a burning fuel can be enhanced so as to upgrade the power. A supercharger is a device that compresses ambient air, so as to increment the density of the air, and conducts it into a cylinder. For example, a turbocharger is well-known as a supercharger that rotates a turbine by the energy of discharged air and supercharges it with a compressor.

In an engine equipped with a supercharger, charging pressure is restricted by a surging area, regardless of whether the supercharger is a normal one or a variable geometry turbocharger (VGT). Surging is a phenomenon that generates a vibration as well as fluctuates air volume, wind pressure and rotation speed, and what is worse, causes an impossibility of traveling when the supercharger is driven in a state of connecting a centrifugal/axial flow blower or a compressor or the like to a conduit line so as to compressively squeeze the air volume.

The surging area is present in a high-speed rotation/low air capacity area where it is represented by a pressure curve with pressure and air volume as characteristics of the supercharger. This surging area boundary is referred to as a surging limitation. The surging limitation depends on the pressure level, the design of an impeller or the model of the supercharger and the like.

When the supercharger is driven beyond the surging limitation, an abnormal sound is generated due to the fluctuation of a boost pressure or a pressure wave vibration, which eventually leads to damages due to the vibration of the compressor. In general, since engines have dispersions of performance as products, an engine injection quantity is controlled so that the supercharger is driven in the area from the surging limitation to a slippage (allowance). Due to the necessity of the slippage for the engine, an advancement in a low speed torque was significantly limited.

Conventionally, there is a well-known method for limiting the injection quantity using a charging pressure sensor and the like when the supercharger is trapped in the surging state. However, this method can limit the injection quantity only when the surging is actually generated. In other words, the fact remains that the surging is actually generated and an abrasive inspiratory sound and a supercharger vibration are generated. There is a problem in terms of the credibility of this method.

For example, in JP 2003-240788, a means for measuring the pressure fluctuation of the supercharger and a turbo rotation number by a turbo rotation number sensor so as to control the supercharger is disclosed. However, the means according to JP 2003-240788, which detects only the turbo rotation number, can reduce the slippage based on the rotation number generated by the surging, but cannot completely eliminate it. Also, when an overspin characteristic of the turbo is generated during the transition duration, such as during the EGR blocking or the acceleration and deceleration, the turbo rotation number is mistakenly decided or the injection quantity is rapidly increased and decreased. Thus, there still remains a problem on the practical side.

Further, the turbo rotation number sensor as described in JP 2003-240788, which receives a signal from a shaft, can measure only one signal per one rotation. In this regard, the sensor cannot detect the turbo surging involving a rotation fluctuation. Moreover, in the turbo rotation number sensor as described in JP 2003-240788, a high peaking capacity is defined as the rotation number determined by performing a frequency analysis, in consideration of the case when the signal includes a noise. Accordingly, the sensor results in performing a filtering and cannot detect an instantaneous rotation fluctuation.

In other words, because the prior art and the turbo rotation number sensor as described in JP 2003-240788 cannot detect the limiting point of the turbo surging, the engine and the supercharger cannot be efficiently driven due to the need for slippage.

The problem to be solved is to identify the surging limitation so as to efficiently drive the engine.

SUMMARY OF THE INVENTION

The problem to be solved by the present invention is as mentioned above. Next, the means for solving the problem will be described.

The present invention comprises at least one index means provided on the turbine shaft or the blade, a detection means, which detects a rotation of the index means and a rotation of the plurality of blades respectively and is connected to a control means, and a turbo angular velocity computing means, which calculates the angular velocity by receiving a plurality of pulses per one rotation of the turbine shaft in an engine equipped with a supercharger consisting of a compressor having a plurality of blades on a turbine shaft and a turbine.

In the present invention, the size of the pulse obtained by the detection means is calculated as a turbo angular velocity by the turbo angular velocity detection means and a turbo rotation number (a turbo average angular velocity) is calculated when the turbo angular velocity is constant.

The present invention comprises a control means, wherein the turbo angular velocity is defined as an absolute value of the turbo angular velocity or a relative value of the turbo average angular velocity.

The present invention comprises a supercharger surging detecting means, wherein it determines that the supercharger comes close to a surging area when a turbo angular velocity amplitude value is beyond a predetermined threshold.

The present invention comprises an engine load detecting means for detecting an engine load, an engine rotation number detecting means for detecting an engine rotation number, an adequate angular velocity amplitude value map, which memorizes a predetermined threshold of the turbo angular velocity on the basis of the engine load and the engine rotation number, and a control means, wherein it determines that the driving of the supercharger comes close to the surging area when the turbo angular velocity is beyond the adequate angular velocity amplitude value.

The present invention comprises a surging avoidance means, which ensures that at least one outlet flow of a fuel injection quantity, a fuel injection pressure or a fuel injection timing is reduced when the driving of the supercharger comes close to the surging area.

The present invention comprises an engine load detecting means for detecting the engine load, an engine rotation number detecting means for detecting the engine rotation number, an adequate turbo rotation number threshold preliminary set up using the engine load and the engine rotation number, and an supercharger fault detection means, which determines that the supercharger is abnormal when the turbo rotation number determined by the turbo angular velocity detecting means is beyond the adequate turbo rotation number threshold for the condition of the engine based on the engine load determined by the engine load detecting means and the engine rotation number determined by the engine rotation number detecting means.

The present invention comprises an exhaust gas reflux system, an exhaust gas reflux volume control means, which controls the reflux volume of the exhaust gas reflux system based on the turbo rotation number determined by the turbo angular velocity detecting means.

The present invention comprises the engine rotation number detecting means, a derating means, which reduces the engine load and the engine rotation number in an arbitrary amount of time when an abnormality is detected based on the engine rotation number determined by the engine rotation number detecting means and the turbo rotation number determined by the turbo angular velocity detecting means.

The present invention comprises at least two or more cylinders, a traveling means with reduced cylinders for stopping the driving of a cylinder when an abnormality of a cylinder is generated and for continuing driving with the remaining cylinders except the reduced cylinder, a fuel injection control means while traveling with reduced cylinders, which controls at least one of: the fuel injection quantity, the fuel injection pressure or the fuel injection timing of the remaining cylinders based on the turbo rotation number determined by the turbo angular velocity detecting means while the traveling with reduced cylinders.

The present invention shows the following effects.

In the present invention, the turbo angular velocity detecting means can double as the conventional turbo angular velocity detecting means. In other words, the versatility of the angular velocity detecting means can be improved, thereby reducing the cost.

In the present invention, the calculated turbo angular velocity value can be easily applied to another control, thereby advancing the versatility.

In the present invention, an angular rate of change in one rotation of the supercharger can be easily detected. The turbo angular velocity can be adequately detected using a detecting means by providing the blades with the index means, thereby reducing the cost.

In the present invention, it can be determined when the supercharger comes close to the surging limitation due to the fluctuation of the turbo angular velocity. In other words, the slippage for the surging area is not needed, or an allowable boundary range for the surging area can be minimized, thereby efficiently driving the engine.

In the present invention, it can be evaluated whether the supercharger comes close to the surging area, and surging avoidance can be performed in accordance with the condition of the engine, i.e., improving the operability of the engine.

In the present invention, when the turbo driving comes close to the surging boundary, the driving in the surging area can be avoided by immediately performing the fuel injection control. In other words, the driving can be avoided while entering into the surging area, thereby improving the credibility of the engine.

In the present invention, the abnormality of the turbo can be easily evaluated, thereby advancing the reliability of the turbo driving.

In the present invention, the turbo rotation number is in proportion to (is in inverse proportion to, depending on the system) the EGR quantity, thereby enhancing the operability of the engine. A response to the EGR quantity is more favorable by detecting the rotation number proportional to the EGR quantity, compared to the temperature sensor and the pressure sensor, thereby improving the controllability of the engine.

In the present invention, driving based on the rotation number and load during derating driving is possible by substituting the turbo rotation number for the load. Accordingly, derating driving can be performed by considering the load, thereby improving the security of the engine.

In the present invention, the fuel injection control based on the load while traveling with reduced cylinders can be performed by substituting the turbo rotation number for the load. Accordingly, the safety of the engine can be improved.

DETAILED DESCRIPTION OF THE INVENTION

Next, embodiments of the present invention will be described.

Figure 1:
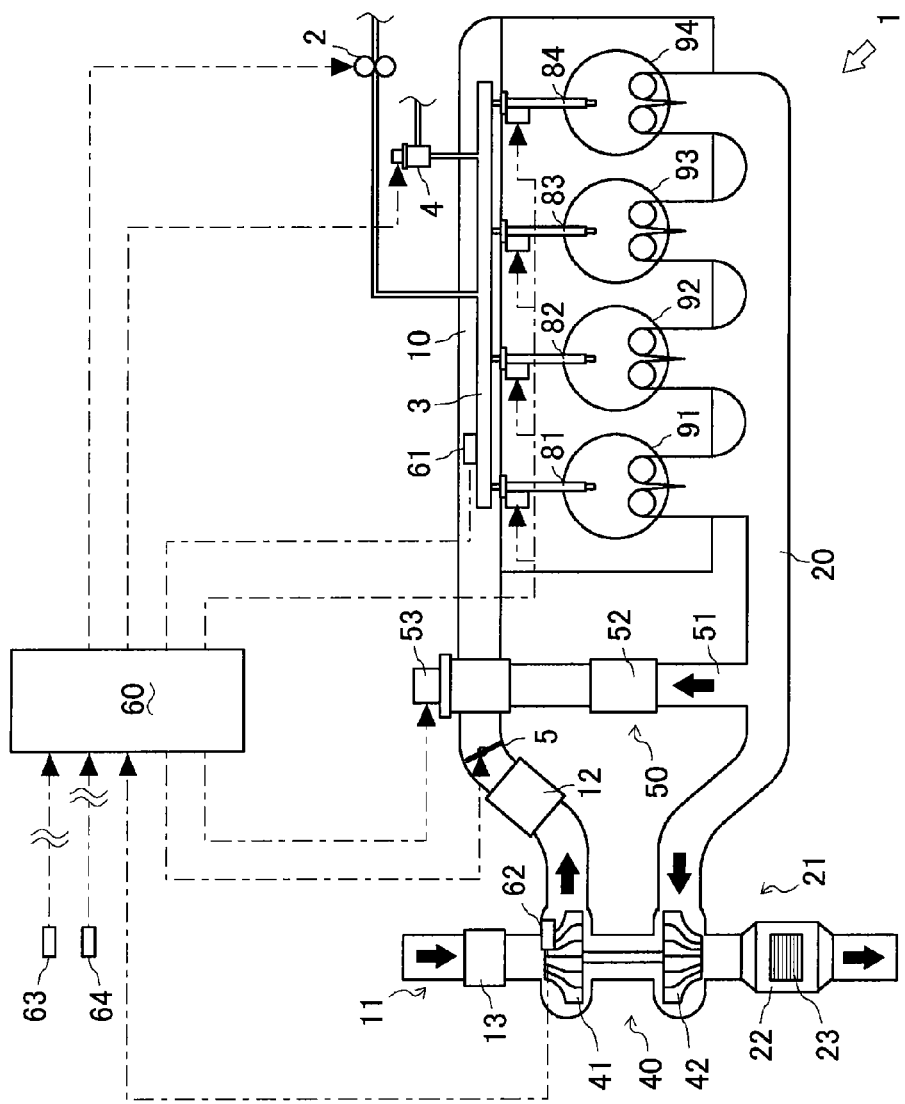
FIG. 1 is a diagram of a system configuration of a four-cylinder diesel engine equipped with a supercharger according to an embodiment of the present invention.
Figure 2:
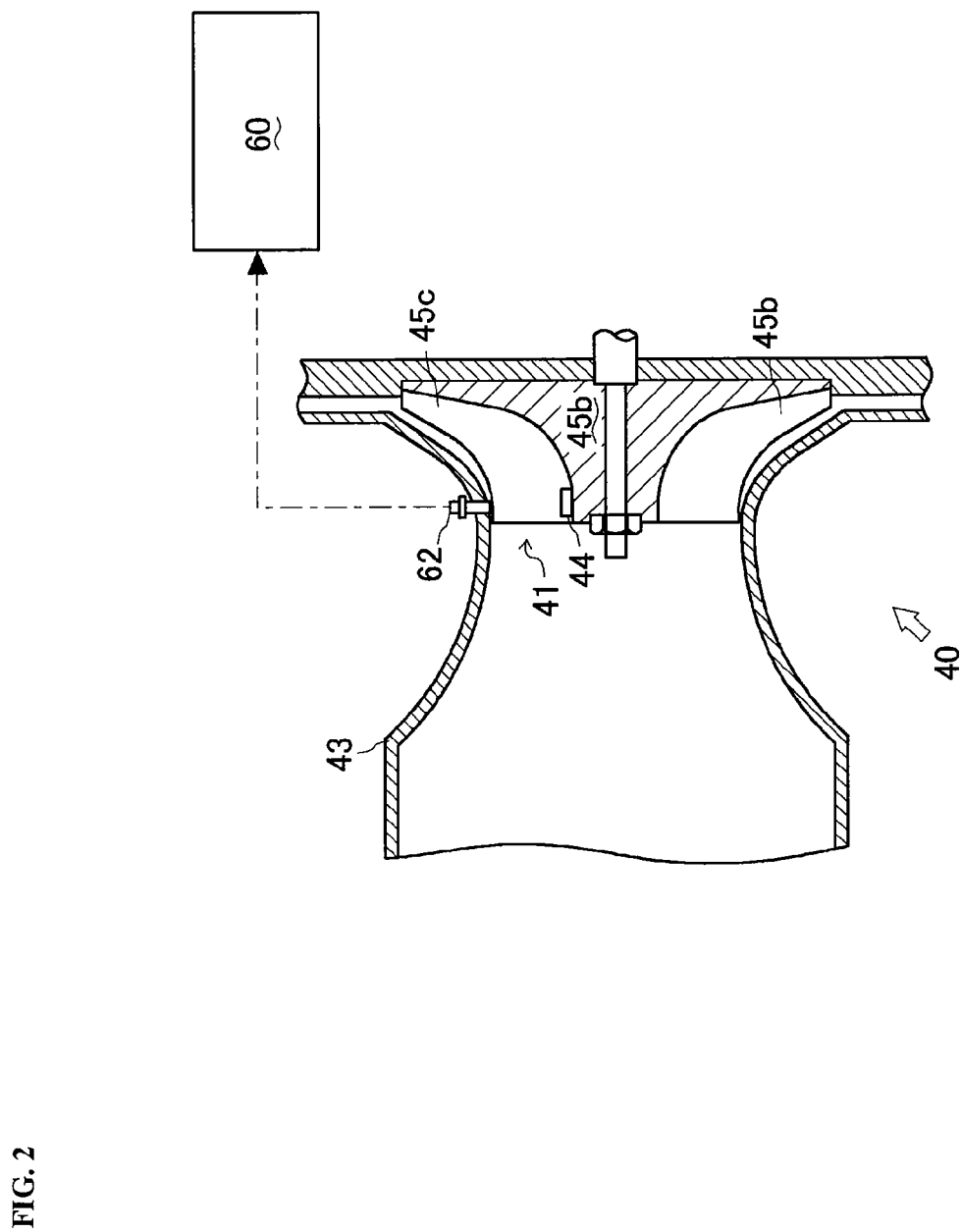
FIG. 2 is a diagram of a cross-sectional structure of a compressor of the supercharger according to an embodiment of the present invention.
Figure 3:
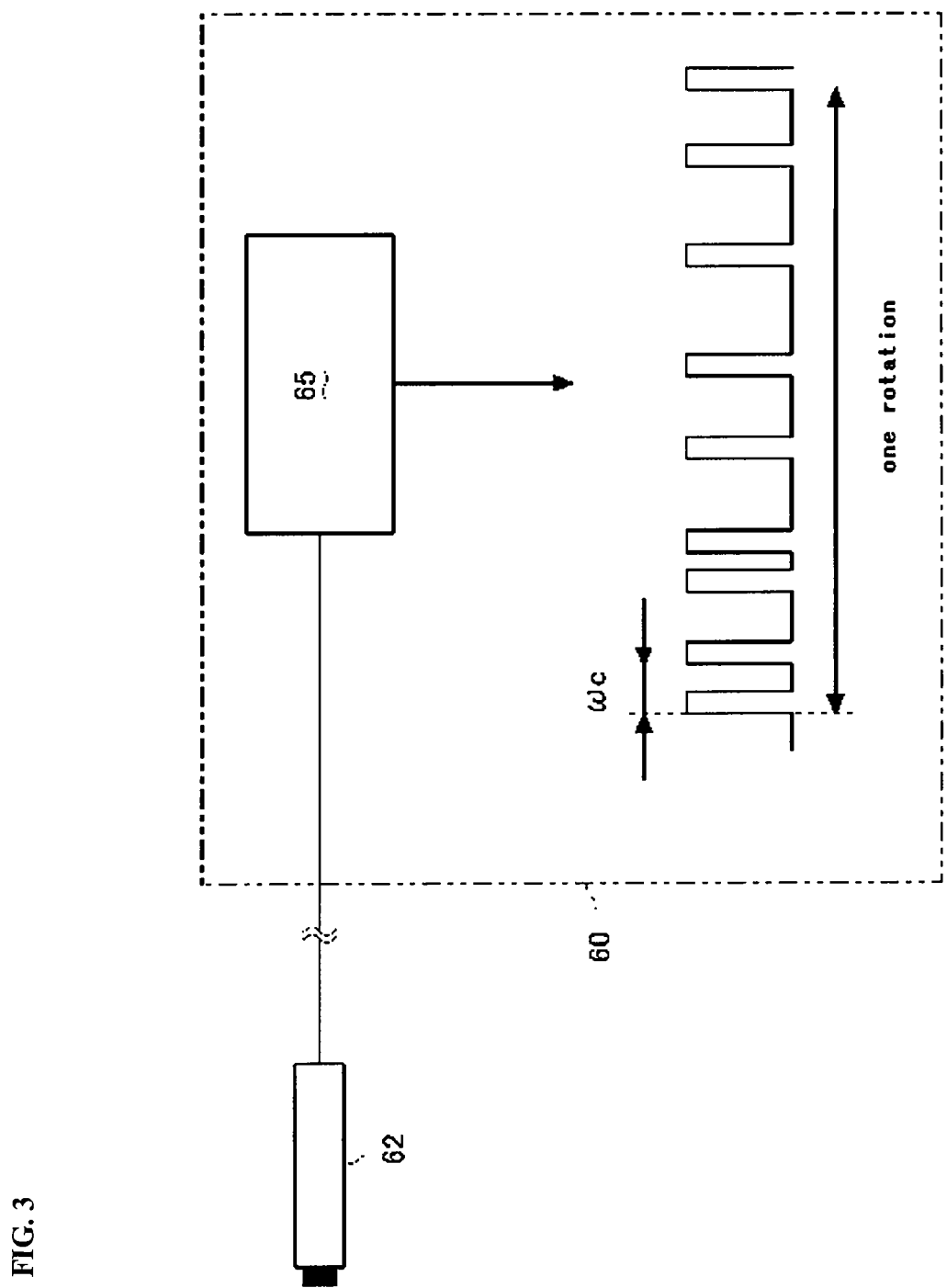
FIG. 3 is a diagram showing a construction of a turbo angular velocity detecting device according to the present invention.

FIG. 1 is a diagram of a system configuration of a four-cylinder diesel engine equipped with a supercharger according to an embodiment of the present invention. FIG. 2 is a diagram of a cross-sectional structure of a compressor of the supercharger according to an embodiment of the present invention. FIG. 3 is a diagram showing a construction of a turbo angular velocity detecting device according to the present invention.

Figure 4:
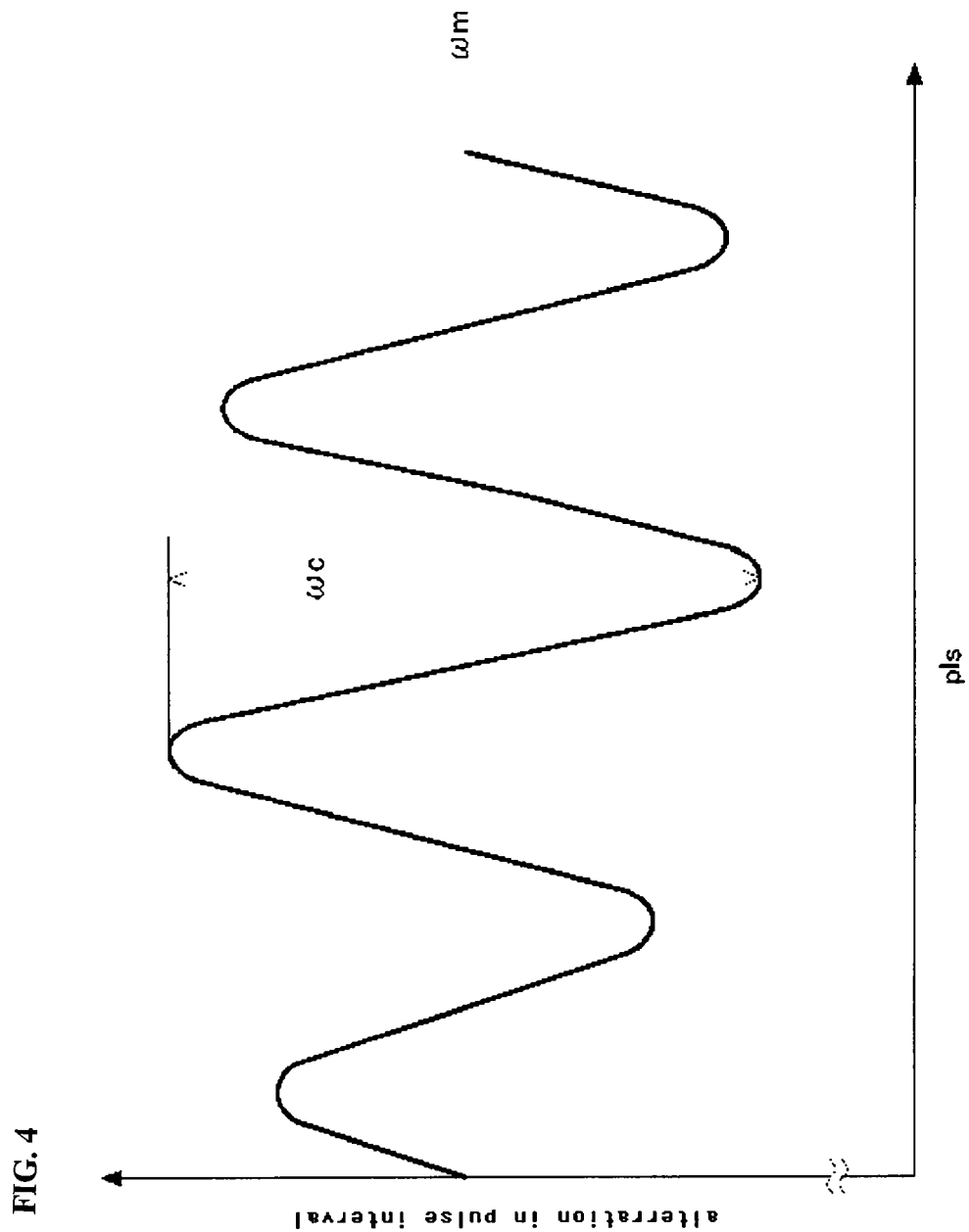
FIG. 4 is a graph chart showing an alteration in a pulse interval to a pulse.
Figure 5:
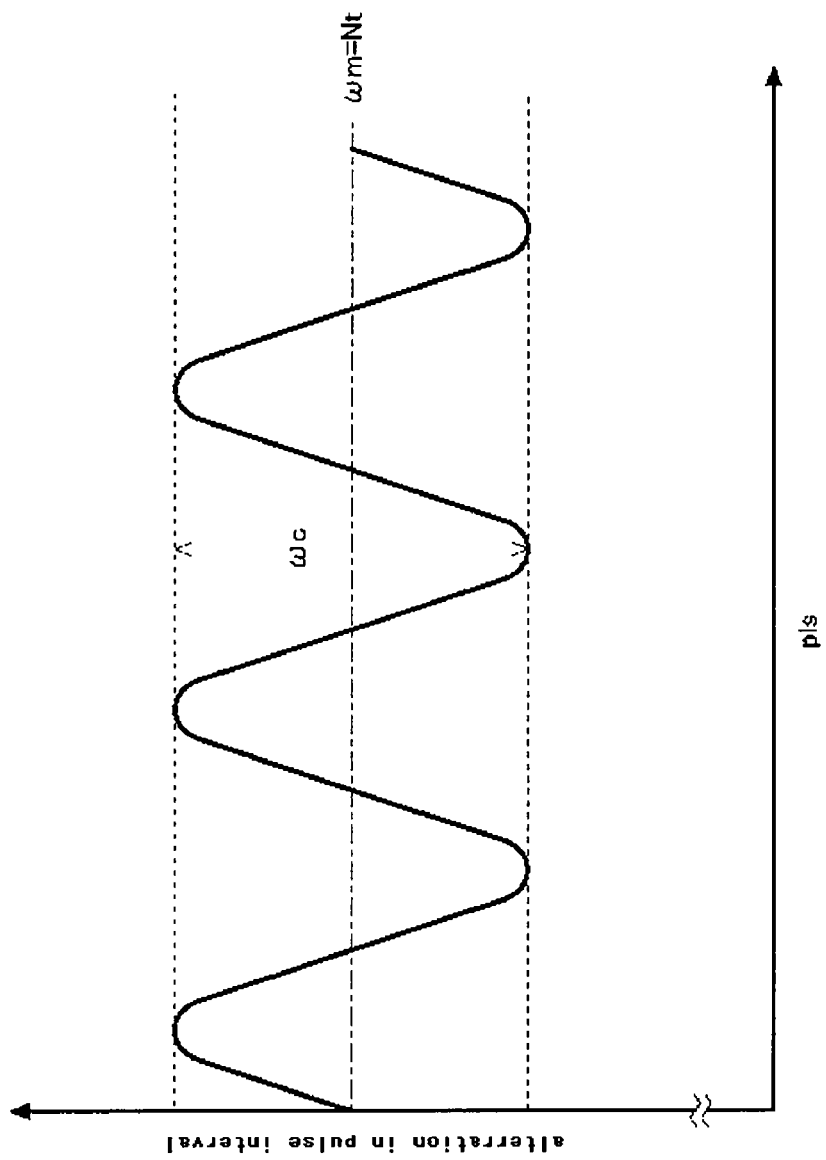
FIG. 5 is a graph chart showing another alteration in a pulse interval to a pulse.
Figure 6:
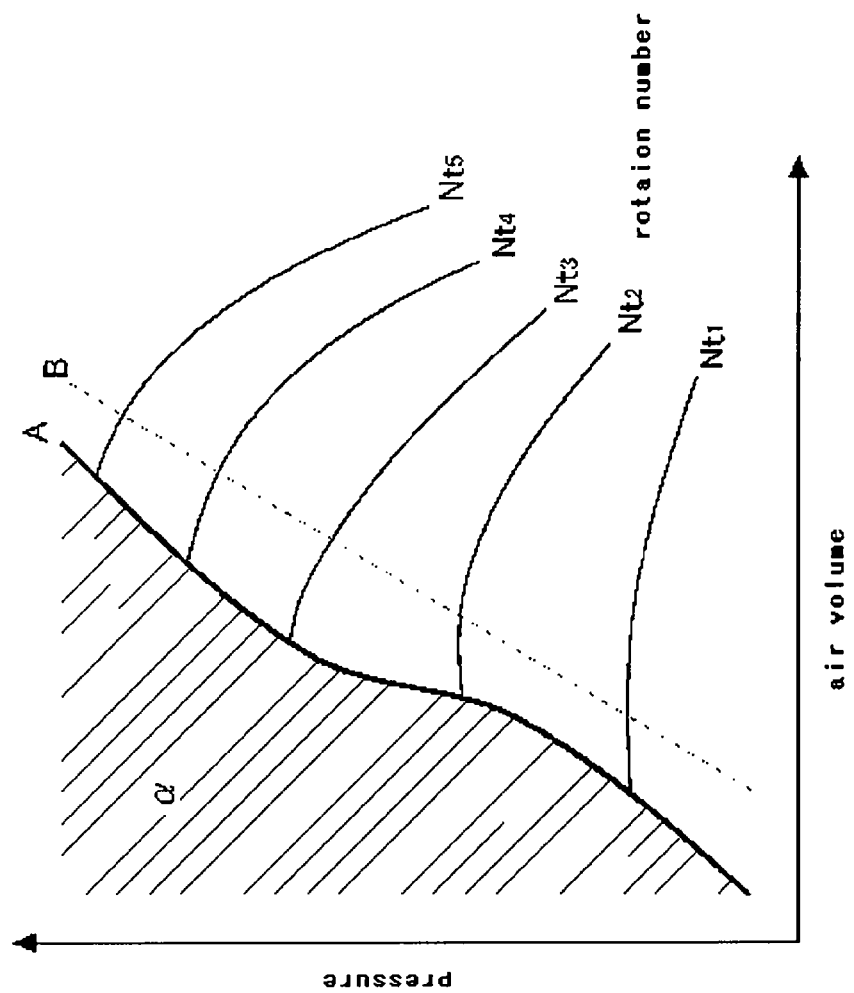
FIG. 6 is a graph chart showing a surging area in a correlation between air volume and pressure.

FIG. 4 is a graph chart showing an alteration in a pulse interval to a pulse. FIG. 5 is a graph chart showing another alteration in a pulse interval to a pulse. FIG. 6 is a graph chart showing a surging area in a correlation between air volume and pressure.

Figure 7:
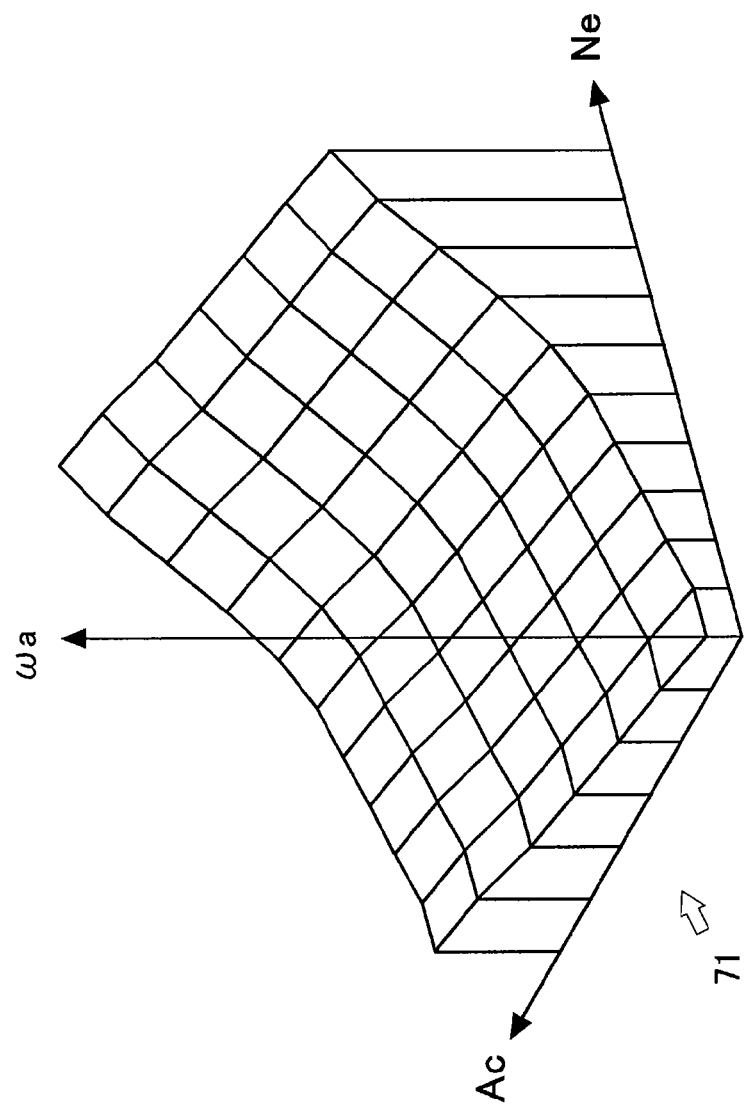
FIG. 7 is a map diagram showing an adequate turbo angular velocity based on an engine rotation number and an engine load.
Figure 8:
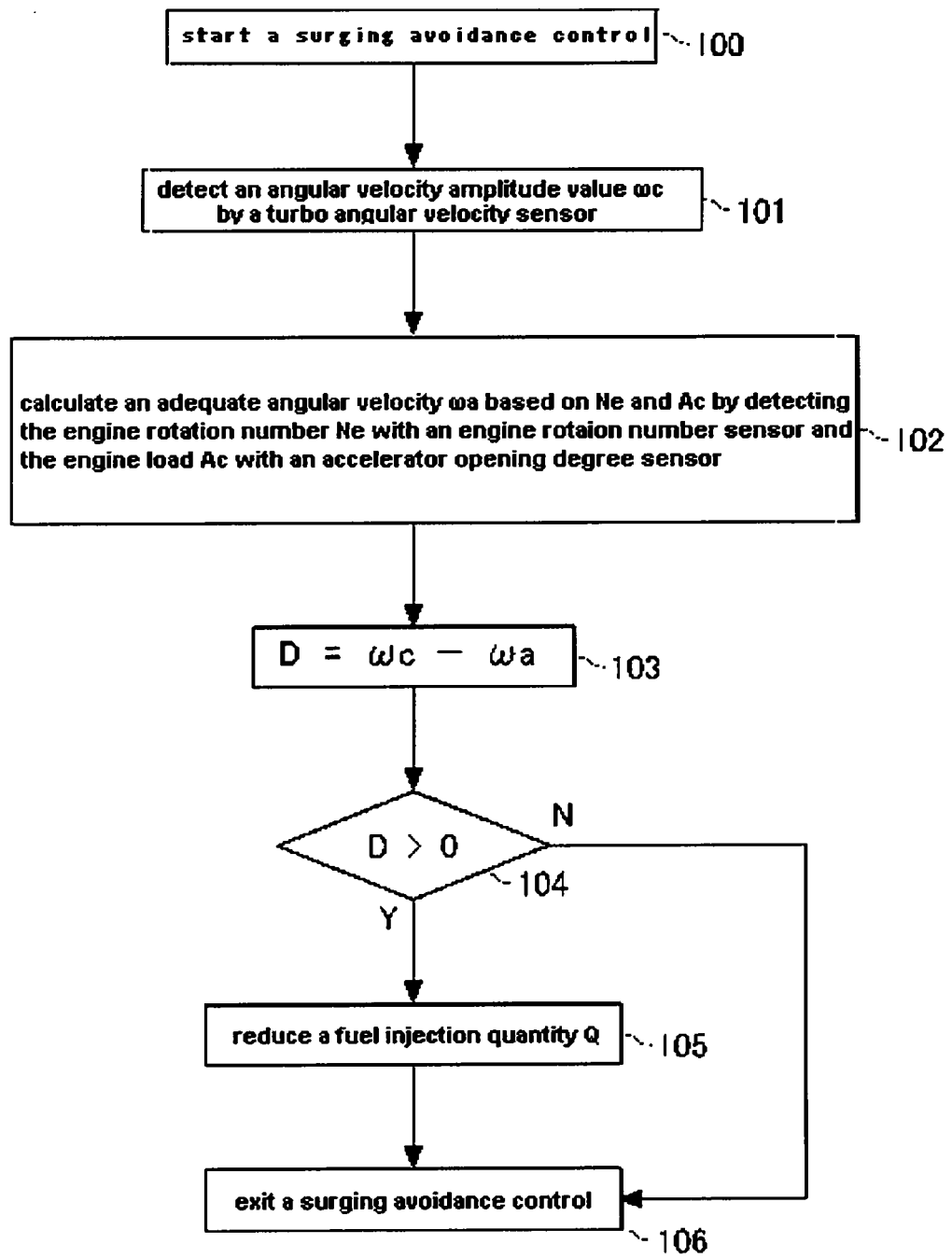
FIG. 8 is a flow diagram of a surging avoidance control.
Figure 9:
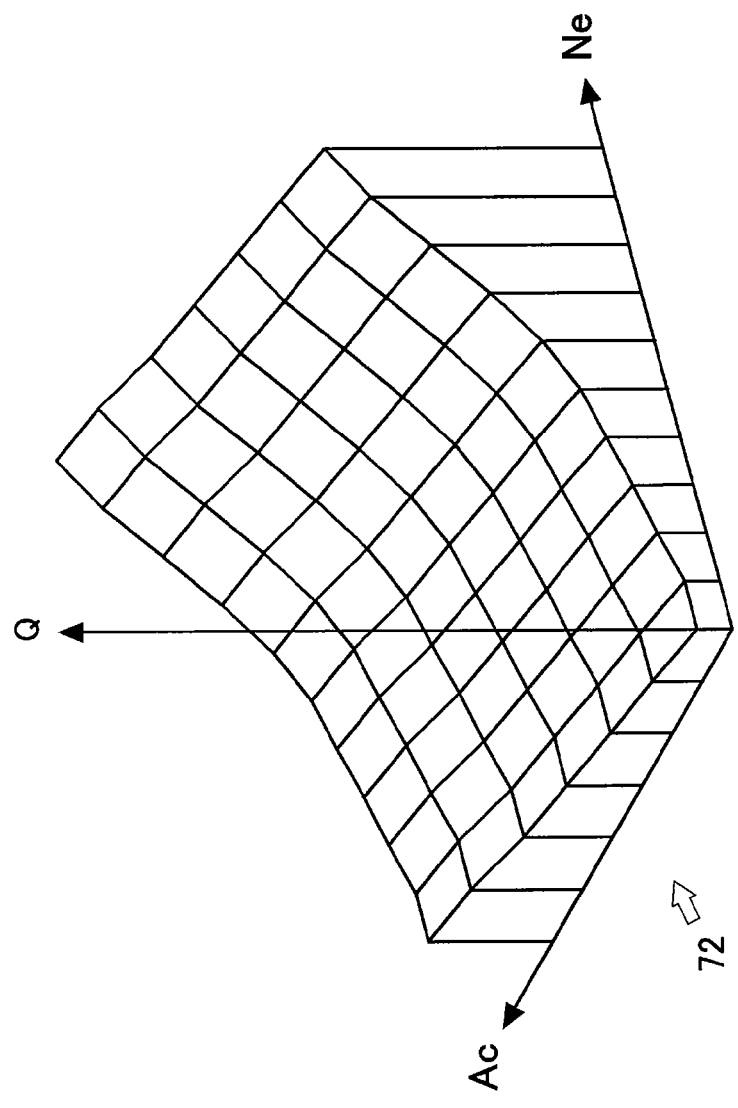
FIG. 9 is a map diagram showing an adequate fuel injection quantity based on the engine rotation number and the engine load.

FIG. 7 is a map diagram showing an adequate turbo angular velocity based on an engine rotation number and an engine load. FIG. 8 is a flow diagram of a surging avoidance control. FIG. 9 is a map diagram showing an adequate fuel injection quantity based on the engine rotation number and the engine load.

Figure 10:
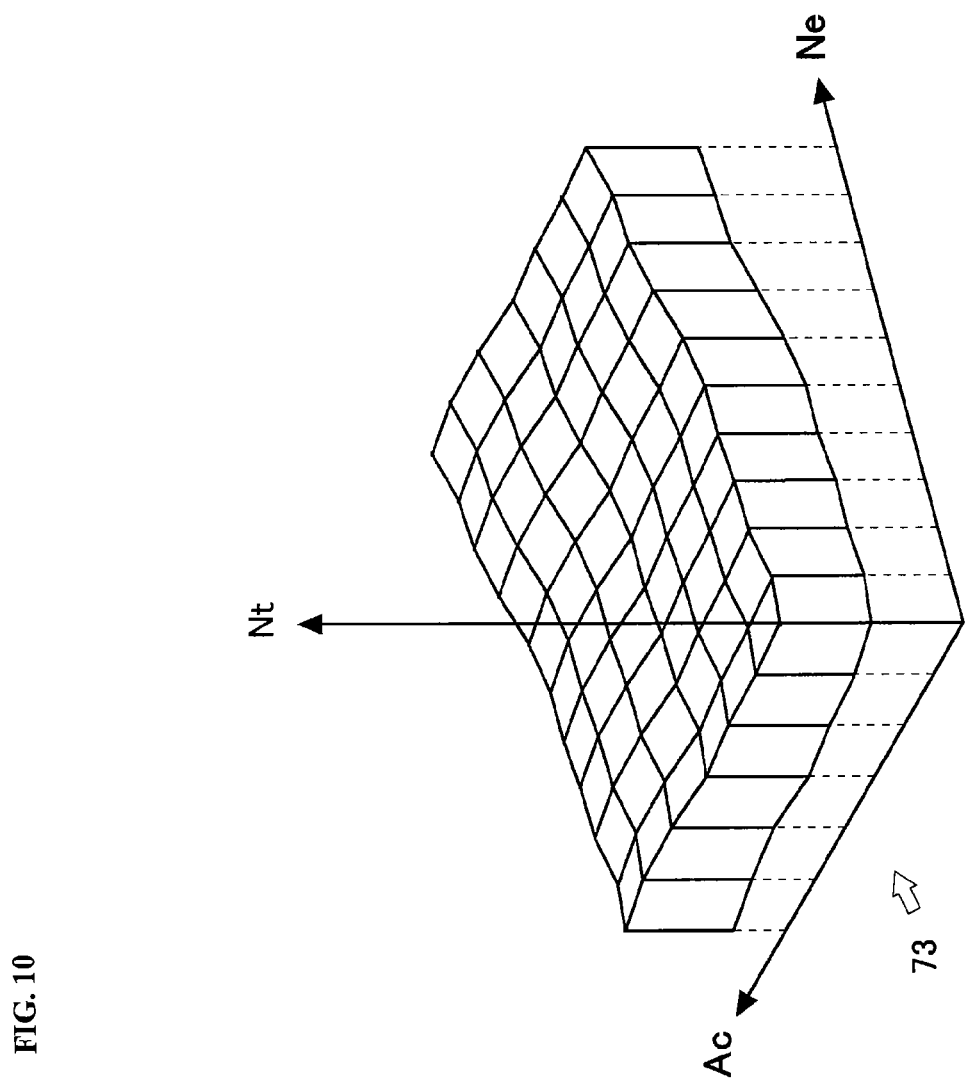
FIG. 10 is a map diagram showing an adequate area of the turbo rotation number based on the engine rotation number and the engine load.
Figure 11:
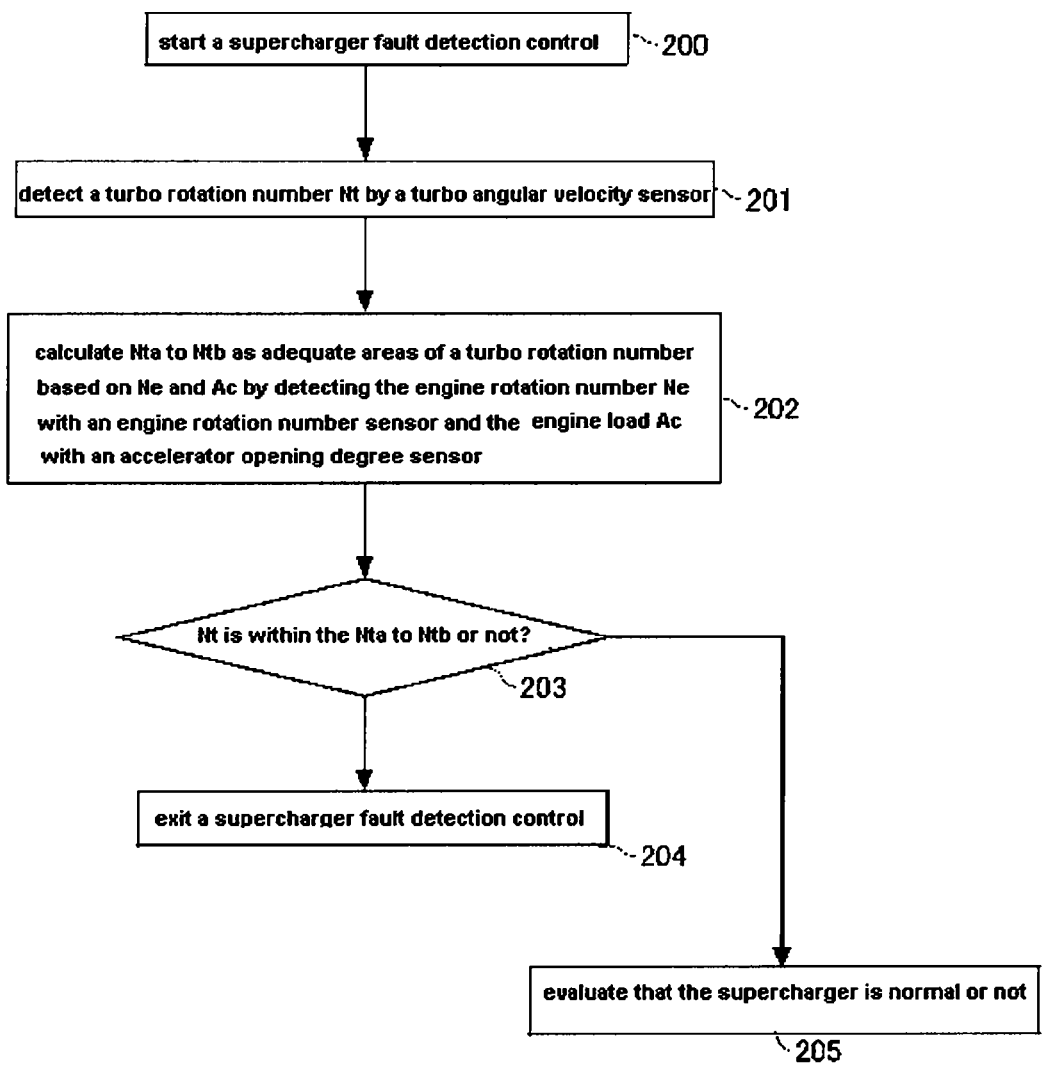
FIG. 11 is a flow diagram of the supercharger fault detection control.
Figure 12:
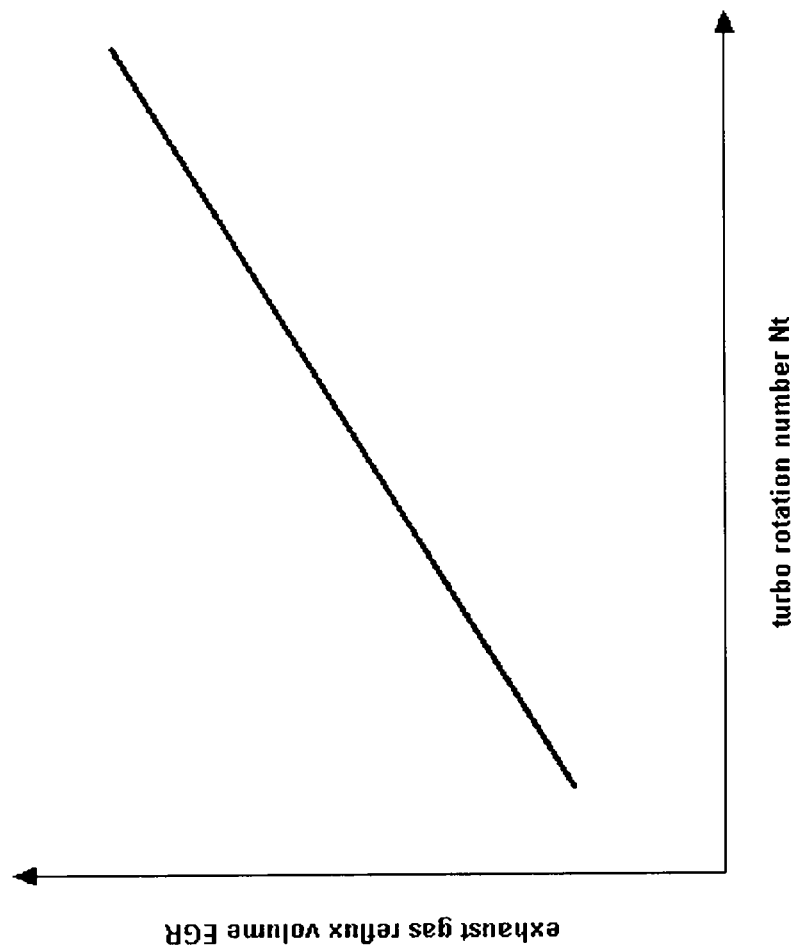
FIG. 12 is a graph chart showing a correlation between the turbo rotation number and the EGR quantity.

FIG. 10 is a map diagram showing an adequate area of the turbo rotation number based on the engine rotation number and the engine load. FIG. 11 is a flow diagram of the supercharger fault detection control. FIG. 12 is a graph chart showing a correlation between the turbo rotation number and an EGR quantity.

Figure 13:
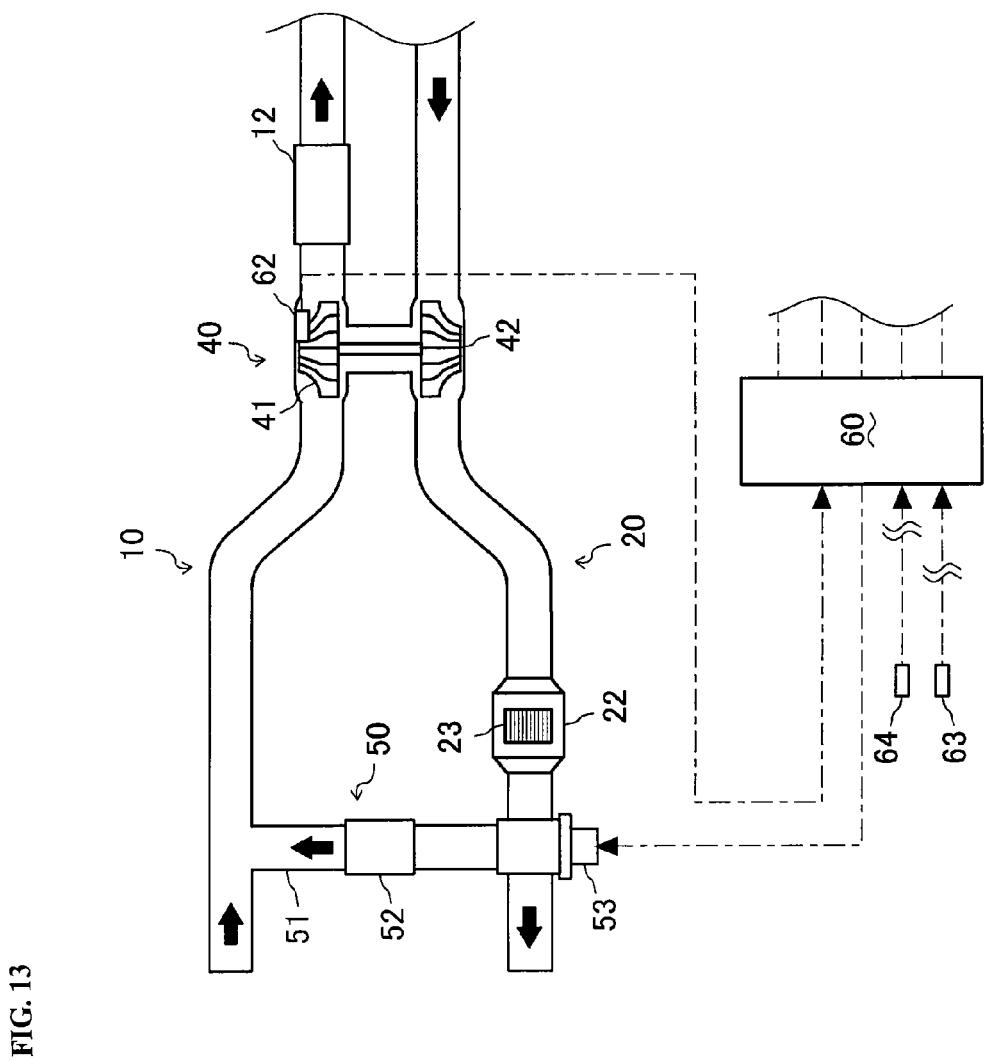
FIG. 13 is a diagram of a structure of a LPL system as an EGR system.
Figure 14:
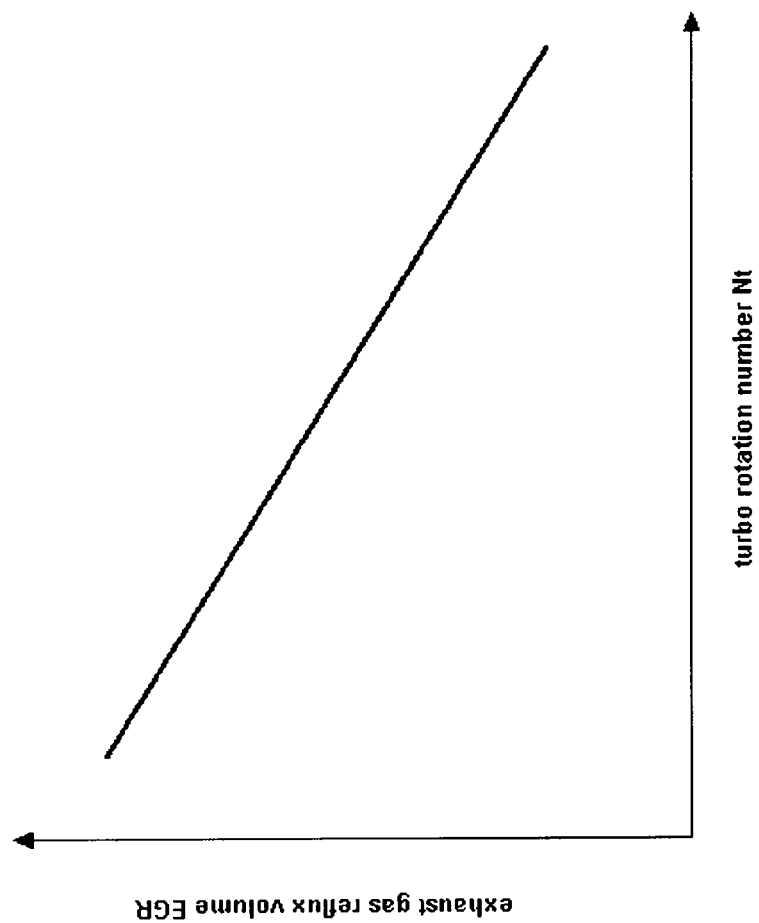
FIG. 14 is a graph chart showing a correlation between the turbo rotation number and the EGR quantity in the LPL system.
Figure 15:
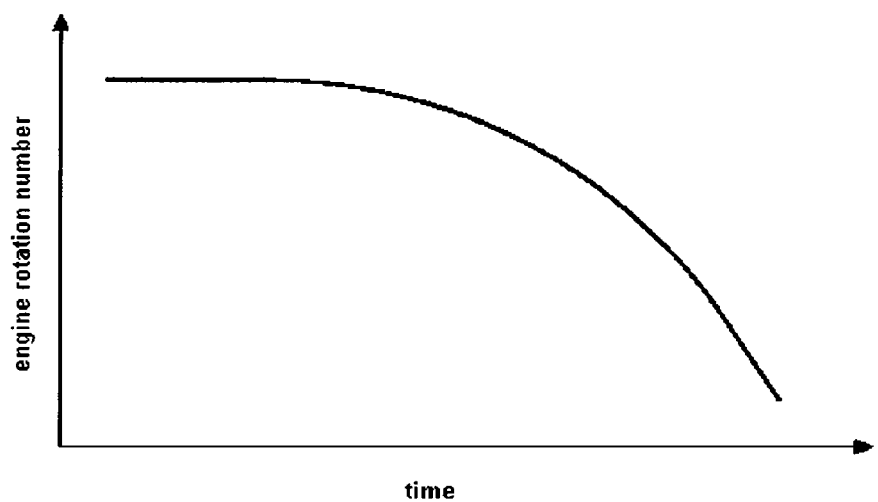
FIG. 15 is a graph chart showing a correlation between the engine rotation number as well as the turbo rotation number and time in a derating means.
Figure 15:
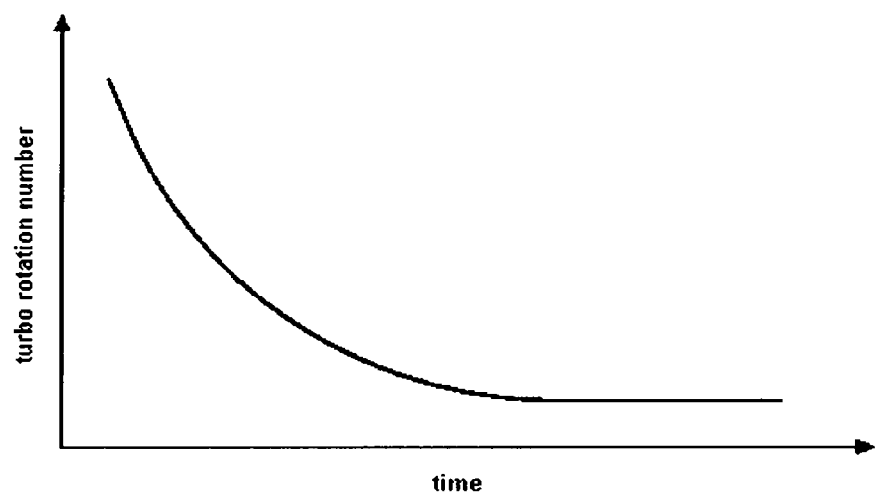

FIG. 13 is a diagram of a structure of a LPL system as an EGR system. FIG. 14 is a graph chart showing a correlation between the turbo rotation number and the EGR quantity in the LPL system. FIG. 15 is a graph chart showing a correlation between the engine rotation number as well as the turbo rotation number and time in a derating means.

Figure 16:
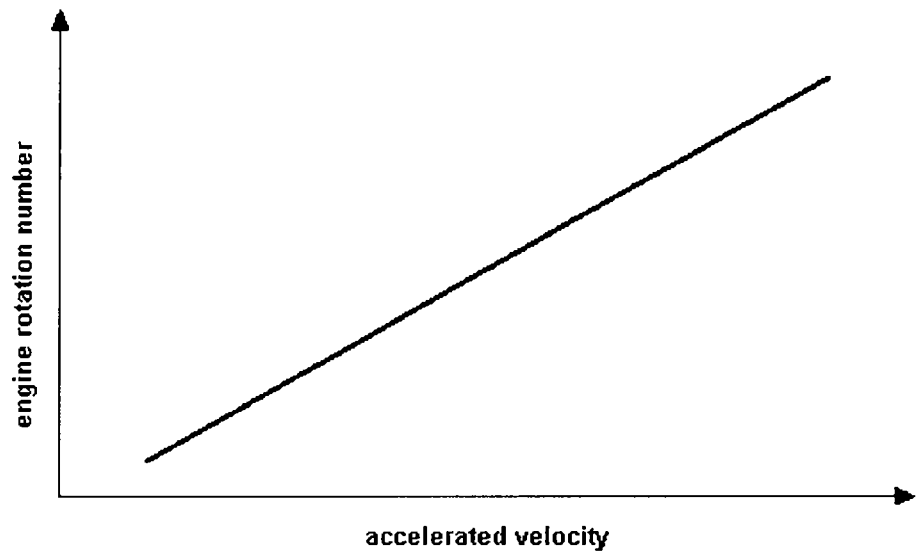
FIG. 16 is a graph chart showing a correlation between the engine rotation number as well as the turbo rotation number and an accelerated velocity in a derating means.
Figure 16:
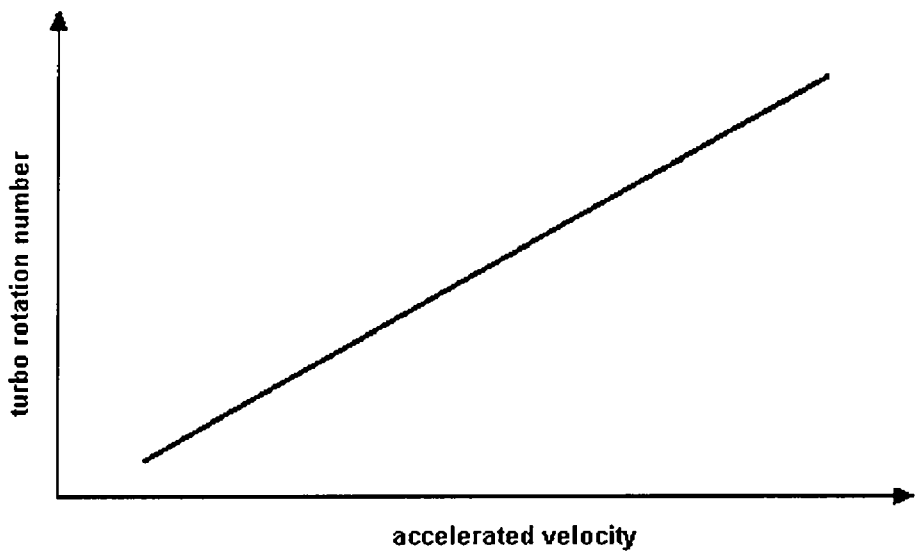
Figure 17:
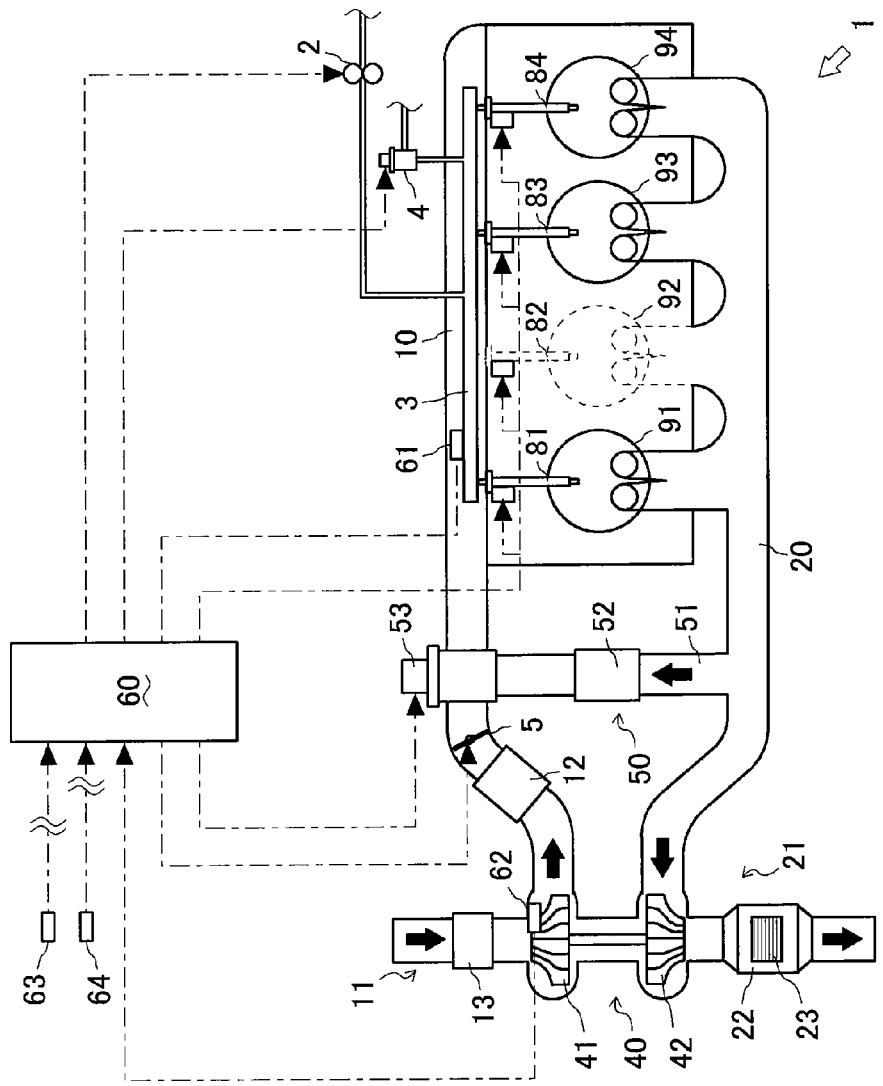
FIG. 17 is a diagram of a system configuration of a four-cylinder diesel engine while traveling with reduced cylinders.

FIG. 16 is a graph chart showing a correlation between the engine rotation number as well as the turbo rotation number and an accelerated velocity in a derating means. FIG. 17 is a diagram of a system configuration of a four-cylinder diesel engine while traveling with reduced cylinders.

A four-cylinder diesel engine 1 equipped with a supercharger 40 according to an embodiment of the present invention will be described.

As shown in FIG. 1, the diesel engine 1 (hereinafter, referred to as simply the engine) is a four-cylinder engine equipped with four cylinders 91, 92, 93 and 94. The engine 1 includes a first cylinder 91, a second cylinder 92, a third cylinder 93 and a fourth cylinder 94. Injectors 81, 82, 83 and 84 for injecting fuel are provided in the respective cylinders 91 to 94. Fuel is supplied from a supply pump 2 connected to a fuel tank (not shown) and accumulated in a common rail 3 so as to be supplied to the respective injectors 81 to 84. The common rail 3 is adaptable so that a fuel pressure in a common rail 52 reaches a target fuel injection pressure by adjusting reflux fuel with a pressure regulation valve 4 or a relief piping (not shown).

An induction system of the engine 1 will be described. An induction manifold (intake manifold) 10 is provided on one side of the engine 1. The intake manifold 10 is connected to the downstream side of an intake passage 11. The intake passage 11 is connected to the intake manifold 10 via an air filter 13, a compressor 41 provided in the supercharger 40 and an intercooler 12. Accordingly, ambient air is introduced to the intake passage 11 and is supplied to the respective cylinders 91 to 94 by the intake manifold 10. A throttle valve 5 is provided on the downstream side of the intercooler 12 in the intake passage 11.

Further, an exhaust system of the engine 1 will be described. A discharge air manifold (exhaust manifold) 20 is placed on the opposite side of the intake manifold 10 of the engine 1. The exhaust manifold 20 is connected to the upstream side of an exhaust passage 21. The exhaust passage 21 is connected to the exhaust manifold 20 via an exhaust cleanup filter 22 and a turbine 42 provided in the supercharger 40. A catalyst 23 is supported on the exhaust cleanup filter 22. Accordingly, an exhaust gas is introduced from the respective cylinders 91 to 94 to the exhaust passage 21 via the exhaust manifold 20 and is outflowed to the outside of the engine 1.

An exhaust gas recirculation system (hereinafter, referred to as simply EGR system) 50 provided in the engine 1 will be described. The EGR system 50 is a device that flows back a part of the exhaust gas to the induction system so as to reduce nitrogen oxides (Nox). The EGR system 50 is connected to the intake passage 11 and the exhaust passage 21. An EGR passage 51 connects the exhaust manifold 20 to the intake passage 11 downstream from the throttle valve 5. The EGR passage 51 includes a cooler 5252 for the EGR that cools the EGR gas (the exhaust gas) from the exhaust manifold 20 and an EGR valve 53 which adjusts reflux volumes of the EGR gas.

An Engine Control Unit (ECU) 60 as a control means that totally controls the engine 1 will be described. The ECU 60 includes a CPU, a RAM and a ROM or the like, and programs and maps are preliminarily stored therein. The ECU 60 is a control device that performs various arithmetic processing based on signals from sensors or the like and that commands a control signal to the respective actuators. The ECU 60 doubles as a correction means for the preliminarily stored program.

As shown in FIG. 1, in the present embodiment, a common rail pressure sensor 61, a turbo angular velocity sensor 62, an accelerator opening degree sensor 63 and an engine rotation number sensor 64 are connected to the ECU 60 as sensors for detecting the condition of the engine 1. The common rail pressure sensor 61 detects the pressure of the common rail 3. The turbo angular velocity sensor 62 detects the turbo rotation number and turbo angular velocity of the compressor 41 of the supercharger 40. The accelerator opening degree sensor 63 detects the engine load and the like. The engine rotation number sensor 64 detects the engine rotation number. Respective injectors (solenoids) 81 to 84, a supply pump 2, a pressure regulation valve (solenoid) 4 and the EGR valve (solenoid) 53 are connected to the ECU 60 as actuators controlling the engine 1.

A configuration of the turbo angular velocity sensor 62 according to the present invention will be described in detail. As shown in FIG. 1, the supercharger 40 includes an exhaust turbine 42 having a plurality of blades on a turbine shaft and a compressor 41 having a plurality of blades. The supercharger 40 is incorporated into a chassis, in a manner which allows it to rotate, and is constituted so that the turbine 42 provided in the exhaust passage 21 and the compressor 41 provided in the intake passage 11 are integrally rotatable in the same direction. Due to the above construction, the turbine 42 driven by the exhaust gas drives the compressor 41, thereby sending compressed air to increase which increases the amount of oxygen.

As shown in FIG. 2, the turbo angular velocity sensor 62 is a turbo angular velocity computing means that calculates the angular velocity by receiving a plurality of pulses per one rotation of the turbine shaft. The turbo angular velocity sensor 62 is provided 43 on the outward side of the compressor 41 in the supercharger 40. The turbo angular velocity sensor 62 is a high-sensitive gap sensor and reacts with aluminum materials. Each of blades 45a, 45b, 45c, 45h of the compressor 41 has an index 44 made of aluminum. In the present embodiment, eight blades 45 have an index 44. Due to the above construction, the turbo angular velocity sensor 62 detects the index 44 whenever the blades 45 of the compressor 41 pass through it, thereby detecting the passage (the rotation number) of the blades 45

Next, a detection of the turbo angular velocity sensor 62 will be described in detail. As shown in FIG. 3, TTL (Transistor-Transistor Logic) conversion amplifier 65 is a conversion means incorporated into the ECU 60. TTL conversion converts information such as 1 or 0 into a physical entity such as an electrical pulse. More specifically, TTL conversion converts a binary number 1 into +5V or 3.3V of voltage and converts a binary number 0 into 0V of voltage. Thus, TTL conversion transmits an electrical signal in accordance with the voltage level. The electrical signal including eight pulses of signals per one rotation is transmitted to the ECU 60 since the compressor 41 of the present embodiment includes eight blades 45. Accordingly, the index 44 detected by the turbo angular velocity sensor 62 is converted into a pulse signal by the TTL conversion amplifier 65 and is transmitted to the ECU 60.

A calculation of the turbo angular velocity and turbo rotation number will be described. The ECU 60 converts the pulse interval, which is detected by the turbo angular velocity sensor 62 and converted by the TTL conversion into the angular velocity or the average rotation number. As shown in FIGS. 4 and 5, the ECU 60 calculates changes of the turbo angular velocity when the pulse number is represented as a horizontal scale and the pulse interval is represented as a longitudinal scale. In other words, the ECU 60 calculates the turbo angular velocity in a non-dimensional manner.

As shown in FIG. 4, the ECU 60 calculates an amplitude value $\omega c$ when the turbo angular velocity $\omega$ is fluctuated (as described herein below, when the driving of the supercharger 40 comes close to the surging area). The ECU 60 may calculate the amplitude value $\omega c$ as a relative value to the aftermentioned average angular velocity $\omega m$ (see FIG. 4) or may directly calculate it as an absolute value $\omega c$.

As shown in FIG. 5, when the turbo angular velocity $\omega$ is constant, i.e., unless the compressor 41 has a rotation fluctuation, the amplitude value $\omega c$ is constant. In this case, the ECU 60 calculates a value of the integral of $\omega c$ as the average angular velocity $\omega m$, i.e., the turbo rotation number Nt.

Accordingly, calculating the turbo angular velocity $\omega$ in a nondimensional manner results in the following advantages in comparison to the means for calculating the turbo angular velocity in the normal time. In other words, conventionally, for example, the turbo average rotation number needed to be calculated using the formula "rotation number N=pulse frequency F/the number Z of blades". Thus, every time the number of blades of the compressor is changed, a new setting for calculating was needed. Because the turbo angular velocity sensor 62 of the present invention calculates the turbo angular velocity in a nondimensional manner, the angular velocity can be calculated regardless of the number of blades. The angular velocity $\omega$ can be calculated only with the pulse interval and the pulse number, thereby improving the calculating speed compared to the conventional means.

The surging generating during the driving of the supercharger 40 will be described. The surging is a phenomenon that generates a vibration as well as fluctuates air volume, wind pressure and rotation speed, and what is worse, causes an impossibility of traveling when the supercharger is driven in a state of connecting an air blower or the like to a conduit line so as to compressively squeeze the air volume.

As shown in FIG. 6, in the supercharger 40, the surging area where the surging is generated is present in a high-pressure/low air capacity area, when the characteristics of the supercharger 40 is represented by a pressure curve with pressure and air volume (an area $\alpha$, in FIG. 6). This surging area boundary is referred to as a surging limitation (a solid line, in FIG. 6). The surging limitation depends on the pressure level, the design of an impeller or the model of the supercharger and the like.

When the supercharger 40 is driven beyond the surging limitation into the surging area, an abnormal sound is generated due to the fluctuation of a boost pressure or a pressure wave vibration, and eventually leads to damage due to the vibration of the compressor. In general, since the engine 1 has a dispersion of performance as a product, an engine injection quantity is controlled so that the supercharger is driven in the area from the surging limitation to an allowance (slippage) (for example, a broken line B in FIG. 6). In other words, in the engine 1 equipped with the supercharger 40, the charging pressure is restricted by the surging area and slippage of the surging boundary. The supercharger may be a conventional normal type one or the variable geometry turbocharger (VGT).

A surging detecting means using the turbo angular velocity detecting means will be described. The surging detecting means detects when the driving of the supercharger comes close to the surging area using the turbo angular velocity sensor 62. As shown in FIG. 7, the ECU 60 preliminarily memorizes an adequate angular velocity amplitude value $\omega a$, in accordance with the condition of the engine consisting of the engine load and engine rotation number of the engine 1, as maps in every engine load and engine rotation number. The adequate angular velocity amplitude value $\omega a$ is set up to have a predetermined ratio delay greater than the angular velocity amplitude value in the surging boundary of the supercharger 40. This memorized map is defined as the adequate angular velocity amplitude value map 71.

Due to the above construction, the ECU 60 can compare the present angular velocity amplitude value $\omega L$ detected by the turbo angular velocity sensor 62 of the supercharger 40 with the adequate angular velocity amplitude value $\omega a$ obtained by the adequate angular velocity amplitude value map 71 preliminarily memorized, on the basis of the present engine load determined by the accelerator opening degree sensor 63 and the present engine rotation number determined by the engine rotation number sensor 64.

In the surging area, the supercharger 40 receives the rotation fluctuation with a severe pressure fluctuation and a large vibration of the compressor itself. This rotation fluctuation is generated when the supercharger 40 comes close to the surging boundary. In other words, when the angular velocity amplitude value we of the present supercharger 40 is the adequate angular velocity amplitude value $\omega a$ or more, the ECU 60 can detect that the supercharger 40 comes close to the surging boundary.

Accordingly, the ECU 60 can detect at the last minute that the supercharger 40 comes close to the surging area by constantly detecting the angular velocity amplitude value of the supercharger 40 and comparing it with the adequate angular velocity amplitude value map 71. The characteristic of the surging detecting means is that it needs not to allow for the conventional slippage. Thus, the supercharger 40 can be driven until it comes close to the surging boundary, thereby improving the driving performance of the supercharger 40. Accordingly, the engine 1 can be efficiently driven.

A surging avoidance means that avoids the driving of the supercharger 40 from the surging area, when the supercharger 40 is detected to come close to the surging boundary by the surging detecting means will be described. When the supercharger 40 comes close to the surging area, an exhaust energy needs to be reduced by decreasing the fuel injection quantity or by advancing an injection timing.

With reference to FIG. 8, a surging avoidance control 100 that reduces the fuel injection quantity will be concretely described. The ECU 60 detects the angular velocity amplitude value $\omega c$ by the turbo angular velocity sensor 62 (S, Step 101). The ECU 60 detects an engine rotation number Ne by the engine rotation number sensor 64 and an engine load Ac by the accelerator opening degree sensor 63. The ECU 60 calculates the adequate angular velocity amplitude value $\omega a$ with the engine rotation number Ne and the engine load Ac (S, Step 102). Next, the ECU 60 calculates a value D ($D=\omega c-\omega a$) and compares the angular velocity amplitude value $\omega c$ with the adequate angular velocity amplitude value $\omega a$ (S, Step 103). When the calculated value D is zero or more (S, Step 104), the ECU 60 reduces the fuel injection quantity Q (S, Step 105). When the calculated value D is zero or less, the ECU 60 exits the surging avoidance control 100 (S, Step 106).

In the surging avoidance control of the present embodiment, the surging avoidance means is defined as a means for reducing the fuel injection quantity, but the surging avoidance means is not limited to the present embodiment. For example, the surging avoidance means may be a means for reducing the exhaust energy such as reducing the fuel injection pressure of the common rail 3 or advancing the fuel injection timing. When the surging avoidance means detects that the supercharger 40 comes close to the surging boundary by the turbo angular velocity sensor 62 and a means for reducing the exhaust energy is performed, a similar effect as the present embodiment can be achieved. Accordingly, the reliability of the engine 1 can be improved by using the surging avoidance means.

A fuel injection control correcting means after the surging avoidance by the surging avoidance means will be described. The fuel injection control correcting means is a means for correcting the changed one out of: the fuel injection quantity, the fuel injection pressure or the fuel injection timing. In general, as shown in FIG. 9, the ECU 60 preliminarily memorizes an adequate fuel injection quantity Q, in accordance with the condition of the engine consisting of the engine load Ac and the engine rotation number Ne of the engine 1, as maps for every engine load Ac and engine rotation number Ne. This memorized map is defined as the adequate fuel injection quantity map 72.

When the fuel injection quantity Q is reduced using the surging avoidance means, the ECU 60 corrects the adequate fuel injection quantity map 72. The correcting means may be a correcting one for directly rewriting the reduced fuel injection quantity Q or a correcting one for adding the ratio delay to the reduced fuel injection quantity Q so as to further rewrite the reduced quantity. The correcting range may be a correction of the whole adequate fuel injection quantity map 72 or of only the condition of the engine consisting of the engine load Ac and the engine rotation number Ne to which the surging avoidance means has been performed.

Accordingly, since the avoidance means performed by the surging avoidance means is memorized, the credibility of the engine 1 can be improved. Incidentally, in the present embodiment, the adequate fuel injection quantity map 72 is corrected, but as long as the surging avoidance means is a means for reducing the fuel injection pressure or for advancing the fuel injection timing, maps can be corrected in accordance with their avoidance means.

A supercharger fault detection means using the turbo angular velocity detecting means will be described. The supercharger fault detection means is a fault detection one for detecting the fault of the supercharger 40 by the turbo angular velocity sensor 62. As shown in FIG. 10, the ECU 60 preliminarily memorizes an adequate range of the turbo rotation number Nt, in accordance with the condition of the engine consisting of the engine load Ac and engine rotation number Ne of the engine 1, as maps for every engine load Ac and engine rotation number Ne. This memorized map is defined as the adequate turbo rotation number range map 73.

As shown in FIG. 11, a supercharger fault detecting control (S, Step 200) as a supercharger fault detection means will be concretely described using the adequate turbo rotation number range map 73. The ECU 60 detects the turbo rotation number Nt by the turbo angular velocity sensor 62 (S, Step 201). The ECU 60 detects the engine rotation number Ne by the engine rotation number sensor 64 and the engine load Ac by the accelerator opening degree sensor 63. The ECU 60 calculates adequate turbo rotation number ranges Na to Nb with the engine rotation number Ne and engine load Ac (S, Step 202). The ECU 60 evaluates whether the turbo rotation number Nt is normal if it is within the adequate turbo rotation number ranges Na to Nb (S, Step 203) and exits the supercharger fault detecting control (S, Step 204). The ECU 60 determines that the turbo rotation number Nt is abnormal if it is not within the adequate turbo rotation number ranges Na to Nb (S, Step 205).

The ECU 60 can evaluate abnormalities except the turbo surging, e.g., the fuel incorporations into the cylinders, the abnormality of the injection quantity and the turbo seizing by the turbo angular velocity sensor 62. When these abnormalities are generated, for example, when an abnormality of fuel incorporation into the cylinders is generated, the turbo rotation number is increased, the turbo rotation number increases and decreases due to the abnormality of the injection quantity, and the turbo rotation number is decreased due to the turbo seizing, thereby detection of abnormalities using the same flow chart as previously described by memorizing the respective abnormal ranges of the rotation number is possible. Accordingly, the reliability of the engine 1 can be improved.

An EGR quantity control means using the turbo angular velocity detection means will be described. As shown in FIG. 1, in the present embodiment, the engine 1 is provided with an EGR system 50. The EGR quantity is the exhaust gas quantity for flowing back the nitrogen oxide (NOx) on the side of the induction system so as to reduce it.

As shown in FIG. 12, it is known that the EGR quantity is proportional to the turbo rotation number. The EGR quantity control means controls the EGR quantity by preliminarily memorizing the correlation (the proportion) between the EGR quantity and the turbo rotation number. In other words, the turbo rotation number by the turbo angular velocity sensor 62 is substituted for the EGR quantity. In the present embodiment, the concrete contents of controlling are not especially limited. For example, controls such as certainly flowing back the predetermined EGR quantity and the like, so as to reduce the nitrogen oxide (NOx), can be performed.

Due to the above construction, the following advantages can be achieved compared to the detection means for the EGR quantity using the conventional X sensor or the airflow sensor. In this regard, because the X sensor or the airflow sensor is exposed to the sea atmosphere in engines equipped with ships and the like, it possesses lower reliability due to the brine damage. The pressure sensor and the like directly measuring the exhaust gas possess lower control accuracy. Since the EGR quantity control means of the present invention can detect the EGR quantity only by the turbo angular velocity sensor 62 provided in the supercharger, additional sensors are not needed. Substitution for the EGR quantity by the turbo angular velocity sensor 62 can detect the EGR quantity more accurately than detections of the temperature and the pressure. Accordingly, the controllability of the engine 1 can be advanced.

An EGR system different from the EGR system illustrated in FIG. 1. will be described. As shown in FIG. 13, the LPL (Low Pressure Loop) system 9 includes an EGR system 50 downstream from the supercharger 40 in the exhaust passage 21. The LPL system 9 includes an exhaust cleanup filter 22 and the catalyst 23 between the supercharger 40 and an EGR valve 53 in the exhaust passage 21. The LPL system 9 also includes an intercooler 12 on the downstream side of the supercharger 40 in the intake passage 12.

As shown in FIG. 14, in the above construction of the EGR system, it is known that the EGR quantity is inversely proportional to the turbo rotation number. The EGR quantity control means preliminarily memorizes the correlation (the inverse proportion) between the EGR quantity and the turbo rotation number so as to control the EGR quantity. Thus, the EGR quantity control means can produce similar effects even if the EGR system of the LPL system 9 has a different configuration.

A derating means with the turbo angular velocity detection means will be described. In general, the derating means is a means for offering a safety allowance so as to reduce the possibility of faults by incidental excessive stresses. Herein, the derating means is considered as a stop means until the engine 1 is stopped in the event of the failure of the engine 1. Hereinafter, the derating means in the case that the engine 1 has some sort of error and must be stopped will be described. As shown in FIG. 15, the ECU 60 performs a reduction of the engine load and a reduction of the engine rotation number due to the time change as a derating means. At this time, the reduction of the engine load is substituted for that of the turbo rotation number of the supercharger 40. In other words, the ECU 60 slows down the engine load and engine rotation number within the predetermined time, based on the turbo angular velocity sensor 62 and the engine rotation number sensor 64, and stops the engine 1.

A derating means using another turbo angular velocity detection means will be described. As shown in FIG. 16, for example, in the engine 1 provided in the ships, the ECU 60 performs a reduction of the engine load and a reduction of the engine rotation number due to the change of acceleration (deceleration) of the ship. In this regard, the ship includes a G sensor 66 to detect the deceleration. In this case, the reduction of the engine load is substituted for that of the turbo rotation number of the supercharger 40.

In other words, the ECU 60 slows down the engine load and the engine rotation number at the prescribed deceleration, on the basis of the turbo angular velocity sensor 62 and the engine rotation number sensor 64, and stops the engine 1.

Due to the above construction, the engine can be stopped by lowering both the engine load and the engine rotation number. The derating means is effective, for example, when the ECU 60 evaluates that the engine 1 is abnormal by the above-mentioned supercharger fault detection means and stops the engine 1. Accordingly, the chance of engine damage can be minimized, thereby improving the security of the engine. Especially in the engine provided in large size ships or large size automobiles, the derating means is highly effective as it can gradually slow down and stop the engine as described above and because a sudden stop (a rapid deceleration) of the engine causes rapid loads on the passengers.

A fuel injection control means while traveling with reduced cylinders using the turbo angular velocity detection means will be described. In the multi cylinder engine, traveling with reduced cylinders is a driving means for provisionally continuing to drive the engine with the remaining cylinders even if one of the cylinders has some sort of abnormality. Traveling with reduced cylinders is performed, for example, when the failure occurs that one of the injectors stops injecting.

As shown in FIG. 17, for example, when the injector 82 (a dotted line in FIG. 17) of the engine 1 fail, the ECU 60 drives the engine 1 using the remaining injectors 81, 83 and 84. At this time, it is preferable that the output of the engine 1 on the side of the exhaust system is confirmed, since dispersion of performance between the injectors exists. The ECU 60 performs the fuel injection control based on the turbo rotation number determined by the turbo angular velocity sensor 62. For example, the ECU 60 increases the fuel injection quantity Q of the remaining cylinders so that the turbo rotation number determined by the turbo angular velocity sensor 62 is equal to that which was determined before traveling with reduced cylinders. The fuel injection control means while traveling with reduced cylinders produces similar effects, regardless of the fuel injection pressure or the fuel injection timing, as long as it is controlled to compensate for the output equivalent of the reduced cylinder Due to the above construction, fuel injection control while traveling with reduced cylinders can be performed using a simple means, so as to achieve the following advantages. Conventionally, fuel injection control while traveling with reduced cylinders has been performed based on the charging pressure sensor or the exhaust gas temperature sensor. The charging pressure sensor or the exhaust gas temperature sensor had low response accuracy in feedback. The charging pressure sensor had low reliability as the atmospheric pressure is different especially at different altitudes. Fuel injection control while traveling with reduced cylinders of the present embodiment can assuredly perform the fuel injection control while traveling with reduced cylinders as a simpler means than these sensors.

INDUSTRIAL APPLICABILITY

The present invention can be available in the common-rail diesel engine.

The invention claimed is:

1. An engine including a supercharger comprising:
   a compressor having a plurality of blades on a turbine shaft and a turbine;
   at least one index means provided on the turbine shaft or the blades,
   a detection means, which detects a rotation of the index means and a rotation of the plurality of blades respectively;
   a turbo angular velocity computing means, which calculates the angular velocity by receiving a plurality of pulses per one rotation of the turbine shaft;
   an engine load detecting means for detecting the engine load;
   an engine rotation number detecting means for detecting the engine rotation number;
   an adequate turbo rotation number threshold preliminary set up using the engine load and the engine rotation number; and
   a supercharger fault detection means,
   wherein the supercharger fault detection means evaluates that the supercharger is abnormal when the turbo rotation number detected by the turbo angular velocity detecting means is beyond the adequate turbo rotation number threshold on the condition of the engine based on the engine load detected by the engine load detecting means and the engine rotation number detected by the engine rotation number detecting means.

2. An engine including a supercharger comprising:
a compressor having a plurality of blades on a turbine shaft and a turbine;
at least one index means provided on the turbine shaft or the blades;
a detection means, which detects a rotation of the index means and a rotation of the plurality of blades respectively;
a turbo angular velocity computing means, which calculates the angular velocity by receiving a plurality of pulses per one rotation of the turbine shaft;
an engine rotation number detecting means for detecting the engine rotation number; and
a derating means,
wherein the derating means reduces the engine rotation number and the engine load in an arbitrary time when an abnormality is detected, on the basis of the engine rotation number detected by the engine rotation number detecting means and the turbo rotation number detected by the turbo angular velocity detecting means.

3. An engine including a supercharger comprising:
a compressor having a plurality of blades on a turbine shaft and a turbine;
at least one index means provided on the turbine shaft or the blades;
a detection means, which detects a rotation of the index means and a rotation of the plurality of blades respectively;
a turbo angular velocity computing means, which calculates the angular velocity by receiving a plurality of pulses per one rotation of the turbine shaft;
at least two or more cylinders;
a traveling means with reduced cylinders for stopping the driving of a
cylinder when an abnormality of the cylinder is generated and continuing driving with the remaining cylinders except the reduced cylinder;
a fuel injection control means while traveling with reduced cylinders,
wherein the fuel injection control means controls at least one out of the fuel injection quantity, the fuel injection pressure or the fuel injection timing of the remaining cylinders on the basis of the turbo rotation number detected by the turbo angular velocity detecting means while traveling with reduced cylinders.

* * * * *

UNITED STATES PATENT AND TRADEMARK OFFICE
CERTIFICATE OF CORRECTION

PATENT NO. : 8,191,370 B2
APPLICATION NO. : 12/304090
DATED : June 5, 2012
INVENTOR(S) : Shimizu et al.

Page 1 of 1

It is certified that error appears in the above-identified patent and that said Letters Patent is hereby corrected as shown below:

On the Title Page: Item (73) Assignee:

Please update the Assignee as shown below:

Yanmar Co., Ltd., Osaka (JP);
Applied Electronics Corporation, Kanagawa (JP);
Toyota Jidosha Kabushiki Kaisha, Aichi (JP)

Signed and Sealed this
Twenty-fifth Day of December, 2012

David J. Kappos
*Director of the United States Patent and Trademark Office*